(12) United States Patent
Wang

(10) Patent No.: US 8,443,860 B1
(45) Date of Patent: May 21, 2013

(54) WELDING GUN OF PLASTICS

(75) Inventor: Cheng-Hsing Wang, Taipei (TW)

(73) Assignee: Shih Li Machine & Hardware Co., Ltd., Taipei (TW)

( * ) Notice: Subject to any disclaimer, the term of this patent is extended or adjusted under 35 U.S.C. 154(b) by 27 days.

(21) Appl. No.: 13/345,577

(22) Filed: Jan. 6, 2012

(51) Int. Cl.
*B32B 37/00* (2006.01)

(52) U.S. Cl.
USPC .......................................... 156/499; 156/579

(58) Field of Classification Search
USPC ............... 156/359, 367, 368, 379.6, 379.7, 156/499, 579
See application file for complete search history.

(56) References Cited

U.S. PATENT DOCUMENTS 5,779,843 A * 7/1998 Kumagai et al. ........... 156/274.2
6,368,448 B1 * 4/2002 Okamura et al. .......... 156/274.2

\* cited by examiner

*Primary Examiner* — James Sells
(74) *Attorney, Agent, or Firm* — Pai Patent & Trademark Law Firm; Chao-Chang David Pai

(57) ABSTRACT

A welding gun of plastics includes a main body, a power cord, a power controller, a transformer and two welding tubes. Each welding tube has one end fixed in the main body and another end formed with a plugging hole extended outward the main body for a pin of a welding wire to plug in. The welding wire can be electrified to create thermal energy that is able to instantly melt the interface of two pieces of plastics, enabling the welding wire to be embedded in plastics so as to reinforce fusing strength.

6 Claims, 5 Drawing Sheets

WELDING GUN OF PLASTICS

BACKGROUND OF THE INVENTION

1. Field of the Invention

This invention relates to a welding gun of plastics, particularly to one taking advantage of a welding wire to reinforce combining strength of two pieces of plastics.

2. Description of the Prior Art

Plastics are usually apt to create residual stress while being manufactured or stress concentration owing to foreign force, posing formation of cracks or splits. Strong glues or other adhesives have been often used to seal such crack or splits. However, because of different abrasion rates of the plastics and the adhesives, sealed cracks of the plastics may damage again after serving for a certain period of time. Although the cracks can be repaired by glues with the same abrasion rate as that of the plastics to avoid damaging again due to different abrasion rates, repaired cracks may still be damaged after a certain period of time as they have a lower strength than that of the plastics themselves.

For preventing damages caused by different abrasion rates and different strength between plastics and glues, conventional jointing tools have as well been used, regularly basing on contacting, heated air, high frequency or supersonic; they are all theorized by conducting heat to make two pieces of plastics instantly melted and fused together, called welding effect, able to prevent repaired cracks from re-damaging as those repaired by glues or adhesives.

Although cracks repaired by the conventional jointing tools can be prevented from damaging again, they may have disadvantages like displacement, surface deformation, distortion and residual stress. Moreover, using such conventional jointing tools to proceed with combining operation not only costs high, but also involves a complicated operation.

SUMMARY OF THE INVENTION

The object of this invention is to offer a welding gun of plastics, with a simple structure, easy to operate, providing a reinforced combining strength.

The main characteristics of the invention are a main body, a power cord, a power controller, a transformer, two welding tubes and a welding wire. The main body is made of insulating materials, provided with an upper cover and a lower cover, which are matched together. Formed between the upper cover and the lower cover is an accommodating space. The main body is further provided with a grip located at the lower portion, and a working member formed at the front end. The grip has a cord hole bored in a bottom surface and an opening bored in an intermediate portion. The working member has two through holes bored in a front surface. The power cord has one end positioned in the main body, and another end fastened with a plug extended outward the cord hole to connect with a power source. The power controller is installed in the main body, electrically connected with the power cord, provided with a rotatable button extended outward the opening of the main body. The transformer is installed in the main body, electrically connected with the power cord and the power controller. Each welding tube is made of electrically conductive materials, with one end electrically connected with the transformer in the main body, with another end formed as a plugging hole and extended outward the through hole. The welding wire is made of conductive materials with some resistance. The welding wire has a connecting portion having two ends formed as pins to electrically plug in the plugging holes of the welding tubes.

As the welding gun is electrified, the welding wire can convert electric energy into thermal energy that can instantly melt interface of two pieces of plastics, so that the welding wire can be embedded in the plastics. With the plastics cooled down to room temperature, the pins of the welding wire can be cut off, so the connecting portion is kept in the plastics to make fusing strength reinforced.

BRIEF DESCRIPTION OF DRAWINGS

This invention is better understood by referring to the accompanying drawings, wherein.

DETAILED DESCRIPTION OF THE PREFERRED EMBODIMENT

Figure 1:
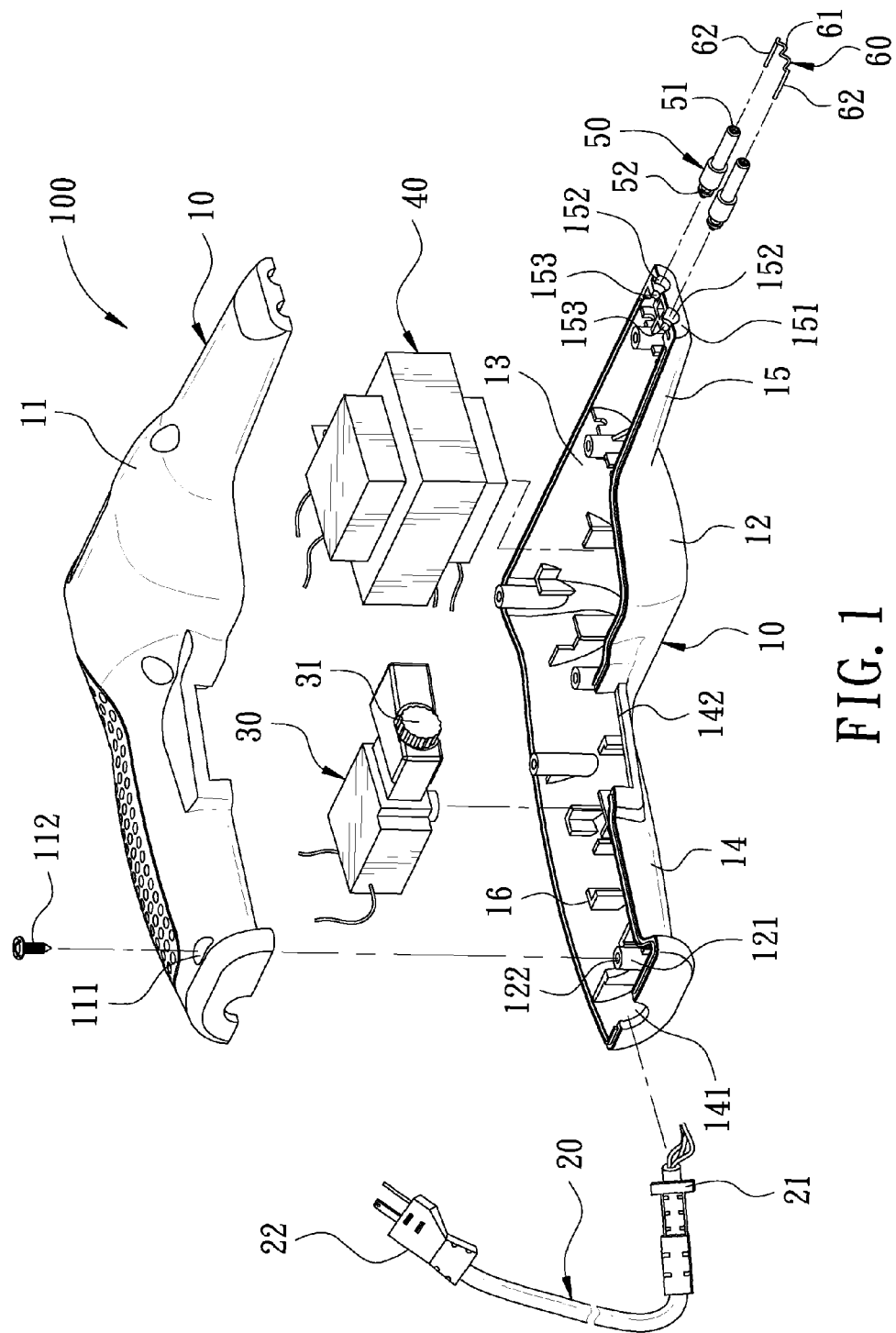
FIG. 1 is an exploded perspective view of a preferred embodiment of a welding gun of plastics in the present invention.
Figure 2:
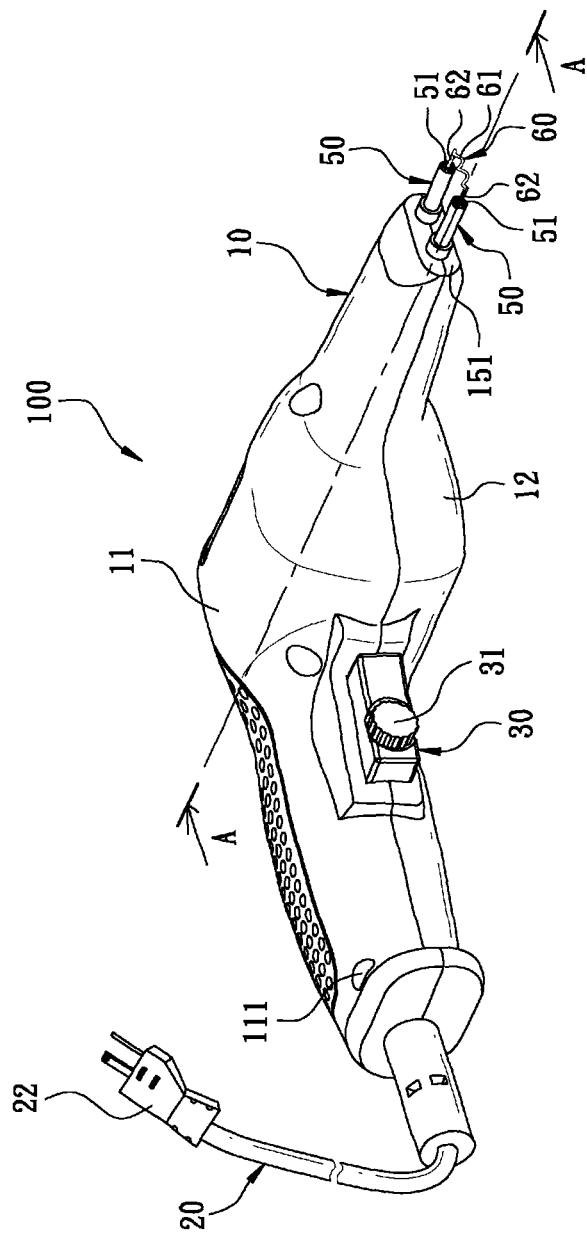
FIG. 2 is a perspective view of the preferred embodiment of a welding gun of plastics in the present invention.

As shown in FIGS. 1 and 2, a preferred embodiment of a welding gun 100 of plastics in the present invention includes a main body 10, a power cord 20, a power controller 30, a transformer 40, two welding tubes 50 and a welding wire 60.

The main body 10 is made of insulating materials, formed as a regular gun in this embodiment, provided with an upper cover 11 and a lower cover 12, which are matched together. Formed between the upper cover 11 and the lower cover 12 is an accommodating space 13. The main body 10 is further provided with a grip 14 located at the lower portion, a working member 15 formed at the front end, and plural fixing plates 16 built on the inner wall. The grip 14 has a cord hole 141 bored in a bottom surface and an opening 142 bored in an intermediate portion. The working member 15 has a vertical surface 151 formed at the front, two through holes 152 bored in the front surface, and an annular flange 153 formed inwards next to each of the through holes 152. The lower cover 12 possesses plural fixing bars 121 respectively formed tubular with an open end and a threaded hole 122. The upper cover 11 has plural fixing tubes 111 corresponding to the fixing bars 121, with the inner diameter of the fixing tubes 111 slightly larger than the outer diameter of the fixing bars 121. Each fixing tube 111 is correspondingly screwed together with the fixing bar 121 by a screw 112. The main body 10 has plural fixing plates 16 that are utilized to make interior components of the main body 10 positioned steadily. The quantities of the fixing bars 121, the fixing tubes 111, the screws 112 and the fixing plates 16 are depending on requirement.

The power cord 20 has one end positioned in the main body 10, provided with an extended positioning member 21 to be blocked by the cord hole 141 of the grip 14. In this embodiment, the positioning member 21 is a flange. The power cord 20 has another end fastened with a plug 22 extended outward the cord hole 141 to connect with a power source.

The power controller 30 is installed in the main body 10, electrically connected with the power cord 20, provided with a rotatable button 31 extended outward the opening 142.

The transformer 40 is installed in the center of the main body 10, electrically connected with the power cord 20 and the power controller 30 respectively.

Figure 3:
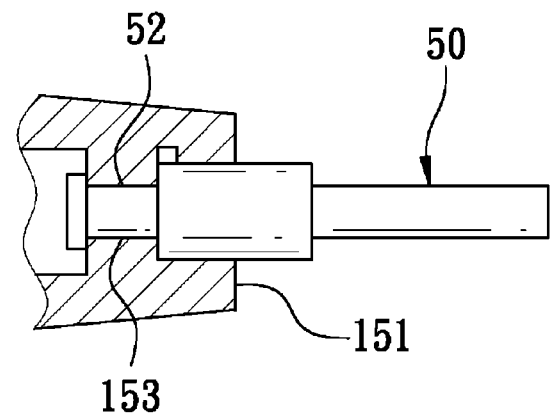
FIG. 3 is a partial cross-sectional view of the 'A-A' line in FIG. 2, showing a front portion of a working member.
Figure 4:
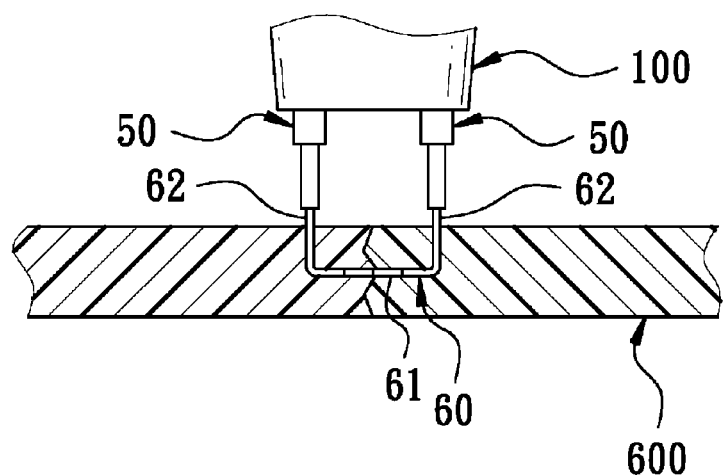
FIG. 4 is a partial side view of the preferred embodiment of a welding gun of plastics in the present invention, showing a welding wire being embedded in plastics.
Figure 5:
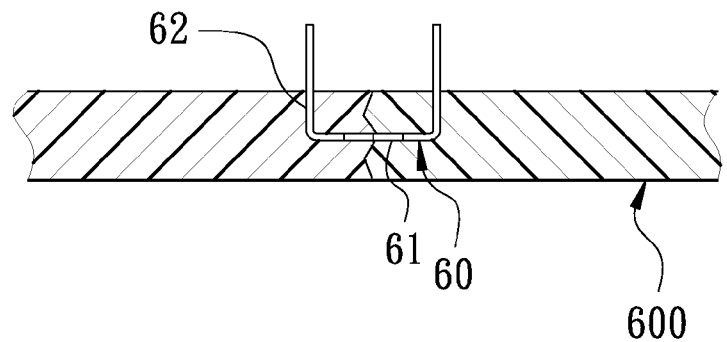
FIG. 5 is a side view of the welding wire embedded in plastics, with the welding gun being removed away.
Figure 6:
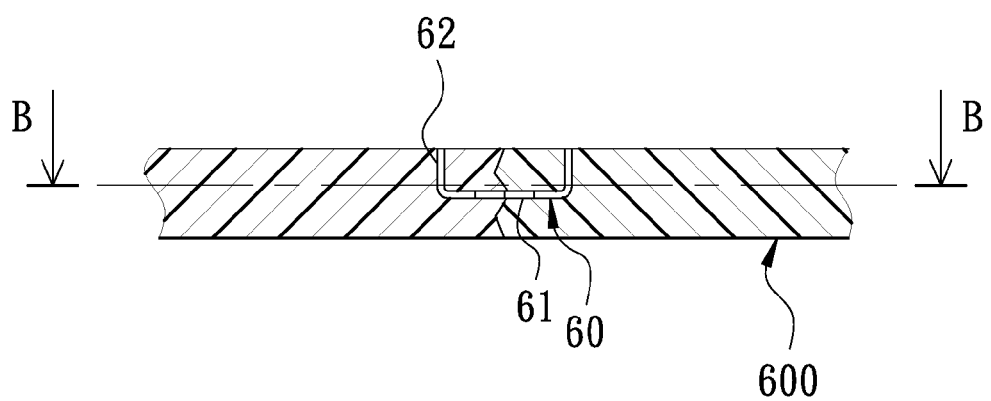
FIG. 6 is a side view of the welding wire embedded in plastics, showing how a connecting portion of the welding wire combines two pieces of plastics.
Figure 7:
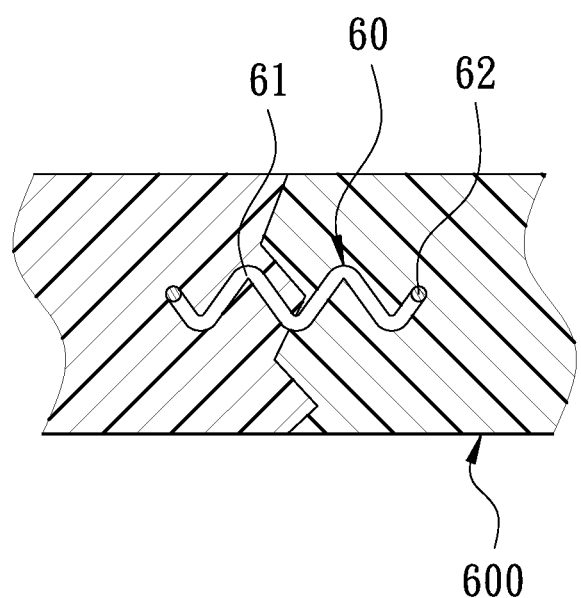
FIG. 7 is a cross-sectional view of the 'B-B' line in FIG. 6.

As shown in FIGS. 1~3, the welding tubes 50 are made of electrically conductive materials, with one end electrically connected with the transformer 40 in the main body 10, with another end formed as a plugging hole 151 and extended outward the through hole 152. And each welding tube 50 has an annular groove 52 fitted in the annular flange 153 to make the welding tube 50 fixed with the main body 10.

The welding wire 60 is made of conductive materials with some resistance and integrally formed with a connecting portion 61 and two pins 62. In this embodiment, the connecting portion 61 is formed wavy, with two ends curved vertically in a same direction to form as the pins 62. So the welding wire 60 is shaped like a U, with the pins 62 plugged in the plugging holes 51 of the welding tubes 50 to get electrified.

In order to further understand the structural features, operative techniques and expected effects of the invention, how to assemble and use the invention is to be described below.

In assembling, as shown in FIGS. 1 and 2, the power cord 20, the power controller 30, the transformer 40 and the welding tubes 50 are first installed in the main body 10, electrically connected as designed. The plug 22 is connected with a power source. In this embodiment, the power cord 20 is connected with an AC power source of 110V, and the pins 62 are inserted in the plugging holes 51 of the welding tubes 50. Thus the assembly of the welding gun 100 is finished.

In using, as shown in FIGS. 4~7, by turning the rotatable button 31, a current is to be outputted to the welding wire 60 that can convert electric energy into thermal energy. Next, the connecting portion 61 of the welding wire 60 can be put on an interface of two pieces of plastics 600 to instantly melt the surface and embed into the plastics 600. Then the rotatable button 31 is turned to stop outputting current, and the welding tubes 50 are separated from the welding wire 60. With the plastics 600 cooled down to room temperature, the pins 62 of the welding wire 60 can be cut off, so the connecting portion 61 is kept in the plastics 600 to make combining strength reinforced.

While the preferred embodiment of the invention has been described above, it will be recognized and understood that various modifications may be made therein and the appended claims are intended to cover all such modifications that may fall within the spirit and scope of the invention.

What is claimed is:

1. A welding gun of plastics, said welding gun comprising:
    a main body made of insulating materials and provided with an upper cover and a lower cover, an accommodating space formed between said upper cover and said lower cover matched together, a cord hole bored in a bottom surface of said main body, an opening bored in an intermediate portion of said main body, two through holes bored in a front surface of said main body;
    a power cord having one end positioned in said main body and another end extended outward said cord hole of said main body to fasten with a plug used to connect with a power source;
    a power controller installed in said main body and electrically connected with said power cord, said power controller further provided with a rotatable button extended outward said opening of said main body;
    a transformer installed in a center of said main body and electrically connected with said power cord and said power controller respectively;
    two welding tubes made of electrically conductive materials and respectively having one end electrically connected with said transformer in said main body and another end formed as a plugging hole to extend outward said through hole of said main body;
    a welding wire made of conductive materials and provided with a connecting portion having two ends curved to form as two pins that can be electrically plugged in said plugging holes of said welding tubes; and
    a mechanism enabling said welding wire to convert electric energy into thermal energy that is able to instantly melt interface of two pieces of plastics so that said welding wire can be embedded in said plastics to reinforce fusing strength.

2. The welding gun of plastics as claimed in claim 1, wherein said connecting portion of said welding wire is formed wavy.

3. The welding gun of plastics as claimed in claim 1, wherein said welding wire is made of conductive materials with some resistance.

4. The welding gun of plastics as claimed in claim 1, wherein said welding wire is integrally formed as a whole.

5. The welding gun of plastics as claimed in claim 1, wherein said main body is further provided with at least an annular flange adjacent to said through holes of said main body to fit in an annular groove cut in said welding tubes, so as to make said welding tubes fixed with said main body.

6. The welding gun of plastics as claimed in claim 1, wherein said pins are bent in a same direction to make said welding wire shaped like an U.

* * * * *